United States Patent
Atchison et al.

(10) Patent No.: US 12,398,903 B2
(45) Date of Patent: Aug. 26, 2025

(54) PARTITIONED CONTROL SYSTEM FOR AN HVAC SYSTEM

(71) Applicant: Johnson Controls Tyco IP Holdings LLP, Milwaukee, WI (US)

(72) Inventors: Shaun B. Atchison, Overland Park, KS (US); Andrew M. Boyd, Wichita, KS (US)

(73) Assignee: JOHNSON CONTROLS LIGHT COMMERCIAL IP GMBH, Neuhausen am Rheinfall (CH)

( * ) Notice: Subject to any disclaimer, the term of this patent is extended or adjusted under 35 U.S.C. 154(b) by 397 days.

(21) Appl. No.: 17/471,907

(22) Filed: Sep. 10, 2021

(65) Prior Publication Data
US 2022/0082286 A1 Mar. 17, 2022

Related U.S. Application Data

(60) Provisional application No. 63/077,281, filed on Sep. 11, 2020.

(51) Int. Cl.
*F24F 11/63* (2018.01)
*G05B 13/02* (2006.01)

(52) U.S. Cl.
CPC ............ *F24F 11/63* (2018.01); *G05B 13/024* (2013.01)

(58) Field of Classification Search
CPC .......... F24F 11/63; F24F 11/64; G05B 13/024
See application file for complete search history.

(56) References Cited

U.S. PATENT DOCUMENTS

| | | |
|---|---|---|
| 9,447,985 B2 | 9/2016 | Johnson |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Tameem D Siddiquee
(74) *Attorney, Agent, or Firm* — Fletcher Yoder, P.C.

(57) ABSTRACT

A control system of a heating, ventilation, and/or air conditioning (HVAC) system includes a primary memory configured to store core control logic defining a plurality of control outputs transmissible by the control system during operation of the HVAC system, a secondary memory configured to store operating data defining a plurality of operating parameters associated with the HVAC system, and processing circuitry communicatively coupled to the primary memory and the secondary memory. The processing circuitry is configured to cause the processing circuitry to operate the HVAC system using the core control logic stored in the primary memory and the operating data stored in the secondary memory.

20 Claims, 7 Drawing Sheets

(56) References Cited

U.S. PATENT DOCUMENTS

| | | | | |
|---|---|---|---|---|
| 2006/0253768 | A1* | 11/2006 | King | H04L 1/0061 714/758 |
| 2007/0028035 | A1* | 2/2007 | Nishihara | G06F 12/0246 711/E12.008 |
| 2008/0126725 | A1* | 5/2008 | Morishita | G06F 11/2069 711/E12.103 |
| 2010/0076605 | A1* | 3/2010 | Harrod | F24F 11/56 700/276 |
| 2011/0071685 | A1 | 3/2011 | Huneycutt et al. | |
| 2012/0143810 | A1* | 6/2012 | Berg-Sonne | H02J 3/003 706/47 |
| 2013/0085615 | A1* | 4/2013 | Barker | G05B 19/418 700/277 |
| 2014/0297041 | A1* | 10/2014 | Kowald | F24F 11/30 700/276 |
| 2015/0074658 | A1* | 3/2015 | Gourlay | H04L 67/01 717/172 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, Llc, Url: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

PARTITIONED CONTROL SYSTEM FOR AN HVAC SYSTEM

REFERENCE TO RELATED APPLICATIONS

This application claims priority from and the benefit of U.S. Provisional Application No. 63/077,281, entitled "A CONTROLLER FOR AN HVAC DEVICE," filed Sep. 11, 2020, which is hereby incorporated by reference in its entirety for all purposes.

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. The HVAC system may include a control system configured to control operation of the HVAC system, such as of the vapor compression circuit. The control system may, for instance, operate a component of the HVAC system to adjust conditioning of the supply air flow. Updating operation of existing control systems may be cumbersome. For example, modifications to software and/or firmware may be made to update the control system. After modification of the software and/or firmware, the control system may undergo testing and/or validation before the control system may operate the HVAC system to condition the supply air flow. As such, the control system may not readily operate the HVAC system after the update, thereby impeding operation of the HVAC system to condition the supply air flow.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a control system of a heating, ventilation, and/or air conditioning (HVAC) system includes a primary memory configured to store core control logic defining a plurality of control outputs transmissible by the control system during operation of the HVAC system, a secondary memory configured to store operating data defining a plurality of operating parameters associated with the HVAC system, and processing circuitry communicatively coupled to the primary memory and the secondary memory. The processing circuitry is configured to cause the processing circuitry to operate the HVAC system using the core control logic stored in the primary memory and the operating data stored in the secondary memory.

In one embodiment, a non-transitory, computer-readable medium includes instructions, that, when executed by processing circuitry, are configured to cause the processing circuitry to retrieve core control logic stored in primary control circuitry of a heating, ventilation, and/or air conditioning (HVAC) system and first operating data stored in secondary control circuitry of the HVAC system, the core control logic defining a plurality of control outputs transmissible to operate the HVAC system and the first operating data defining a first plurality of operating parameters associated with the HVAC system, transmit a first control output of the plurality of control outputs defined by the core control logic based on the first plurality of operating parameters defined by the first operating data, and receive an update to the first operating data stored in the secondary control circuitry. The instructions, when executed by the processing circuitry are also configured to cause the processing circuitry to cause the secondary control circuitry to overwrite the first operating data with storage of second operating data in response to receiving the update, the second operating data defining a second plurality of operating parameters associated with the HVAC system, retrieve the core control logic and the second operating data, and transmit a second control output of the plurality of control outputs defined by the core control logic based on the second plurality of operating parameters defined by the second operating data.

In one embodiment, a heating, ventilation, and/or air conditioning (HVAC) system includes a component configured to operate to provide the HVAC system with conditioning capabilities, secondary control circuitry configured to store operating data, and primary control circuitry communicatively coupled to the component and to the secondary control circuitry. The primary control circuitry is configured to store core control logic separately from the operating data stored in the secondary control circuitry, the core control logic defining a plurality of control outputs transmissible from the primary control circuitry to the component, retrieve the operating data stored in the secondary control circuitry, and transmit, to the component, a control output of the plurality of control outputs defined by the core control logic and in accordance with the operating data stored in the secondary control circuitry.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
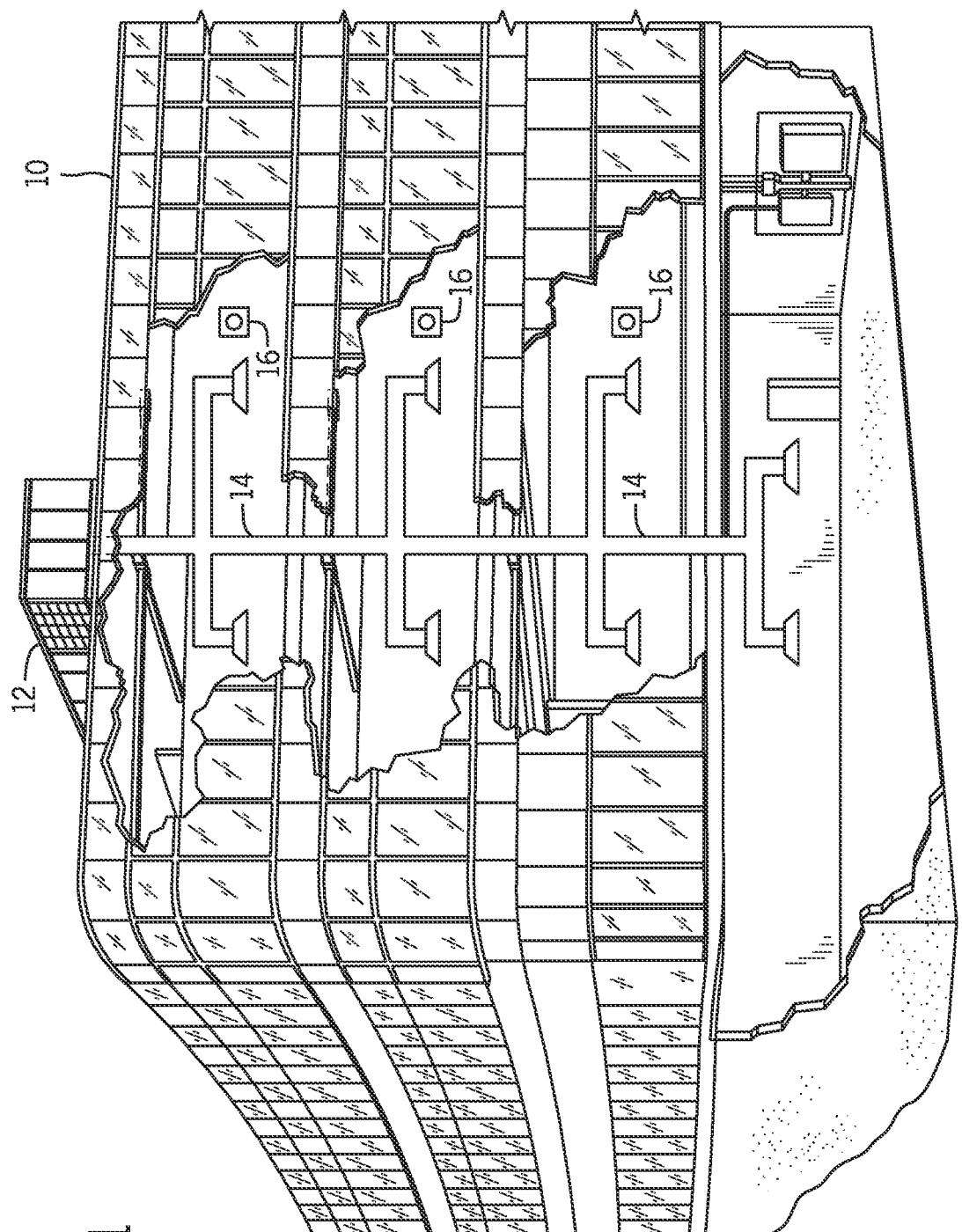
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a control system configured to operate the HVAC system. For example, the control system may regulate operation of various components of the HVAC system to enable the HVAC system to condition an air flow and/or a space. In certain embodiments, the control system may operate the HVAC system based on various operating parameters, such as a setting or mode at which the components may be operated. Indeed, the control system may use a control scheme (e.g., software, firmware, processor-executable instructions), which may define the operating parameters to operate the HVAC system.

In some circumstances, the control scheme used by the control system may be updated after the control system and/or other components of the HVAC system have been assembled and/or installed. For example, the operating parameters defined by the control scheme may be changed to enable more efficient or desirable operation of the HVAC system. As such, a portion of the control scheme may be modified or changed, even for relatively minor updates (e.g., to adjust a single operating parameter). The HVAC system may then undergo subsequent testing and/or validation to confirm that the HVAC system operates desirably after the control scheme has been modified. Thus, the HVAC system may not be readily available to operate and condition the air flow and/or the space after the control scheme has been updated, thereby impeding operation of the HVAC system. Additionally or alternatively, modifying the control scheme used by the control system may inadvertently impact operation of the HVAC system in an undesirable manner. As an example, adjusting the control scheme may increase susceptibility that errors, bugs, and/or glitches in the software code, such as a faulty line of software code, are introduced. The errors may impair operation of the HVAC system.

Thus, it is presently recognized that reducing the portions of the control scheme being modified to update the control system may improve operation of the HVAC system. Accordingly, embodiments of the present disclosure are directed to a control system with a control scheme that may be separated into different memory. For example, a first memory, which may be a primary memory, may store core control logic that defines communication parameters between the control system and other components to operate the HVAC system, such as various control outputs (e.g., signals) that may be transmitted by the control system to operate the HVAC systems. For instance, the core control logic may define a respective control output to operate different operating parameters of a component, such as different operating modes, operating settings, and/or operating levels. As an example, the core control logic may define the respective control output to operate a variable speed fan (e.g., a condenser fan) at each of a plurality of operating speeds. The core control logic may also define which components are to be controlled by the control system in response to a received control input, such as that the variable speed fan is to be operated during a received call for cooling the air flow and/or space. The core control logic may further define proper or desirable operation of the HVAC system, such as operating parameters of the components that would enable the HVAC system to comply with regulations, codes, standards, guidelines, and/or criteria. Additionally, a second memory, which may be a secondary memory, may store operating data that may include specific operating parameters for operating the HVAC system. That is, the operating data may define the particular operating mode, operating setting, and/or operating level to which a component of the HVAC system may be operated in response to a received control input. To provide an example, the operating data may define the particular speed of operation of the variable speed fan in response to the received call for cooling. Thus, in response to the call for cooling, the particular operating speed of the variable speed fan may be identified based on the operating data, and the control output associated with the particular operating speed may be selected via the core control logic. The control output may then be transmitted to the variable speed fan to operate the variable speed fan at the particular operating speed.

A processor, such as a primary processor, may retrieve the operating data from the second memory and use the operating data with the core control logic of the primary memory. The processor may then operate the HVAC system using the core control logic and the operating data, such as to transmit control outputs defined by the core control logic and in accordance with the specific settings defined by the operating data. During an update to the control system, the operating data may be changed or modified, but the core control logic may remain the same or substantially the same. That is, the operating parameters included in the operating data may be changed based on the update without substantially changing the communication between the control system and other components as defined in the core control logic. For example, after the update to the control system, the processor may use the updated operating data and substantially the same core control logic to operate the HVAC system. Indeed, the operating data may include software and/or firmware (e.g., data, software code) that is more subject to being updated or modified, such as for different HVAC system models, configurations, and/or embodiments. The core control logic may include software and/or firmware (e.g., data, software code) that is less subject to being updated or modified. For instance, the core control logic may be substantially the same for different HVAC systems. Thus, the update to the control system may not change or substantially change the core control logic. As such, the core control logic may ensure that the HVAC system continues to operate desirably (e.g., complies with regulations, codes, criteria, guidelines, standards) after the operating data has been updated. Thus, the control system may not be tested and/or calibrated after update of the control system to determine whether the HVAC system operates desirably, and the HVAC system may therefore be readily operated by the control system. Furthermore, limiting the changes made to the core control logic may reduce susceptibility of introducing an error, a bug, and/or a glitch to the control scheme used by the processor to operate the HVAC system. Thus, operation of the HVAC system based on updates to the control system may be improved.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
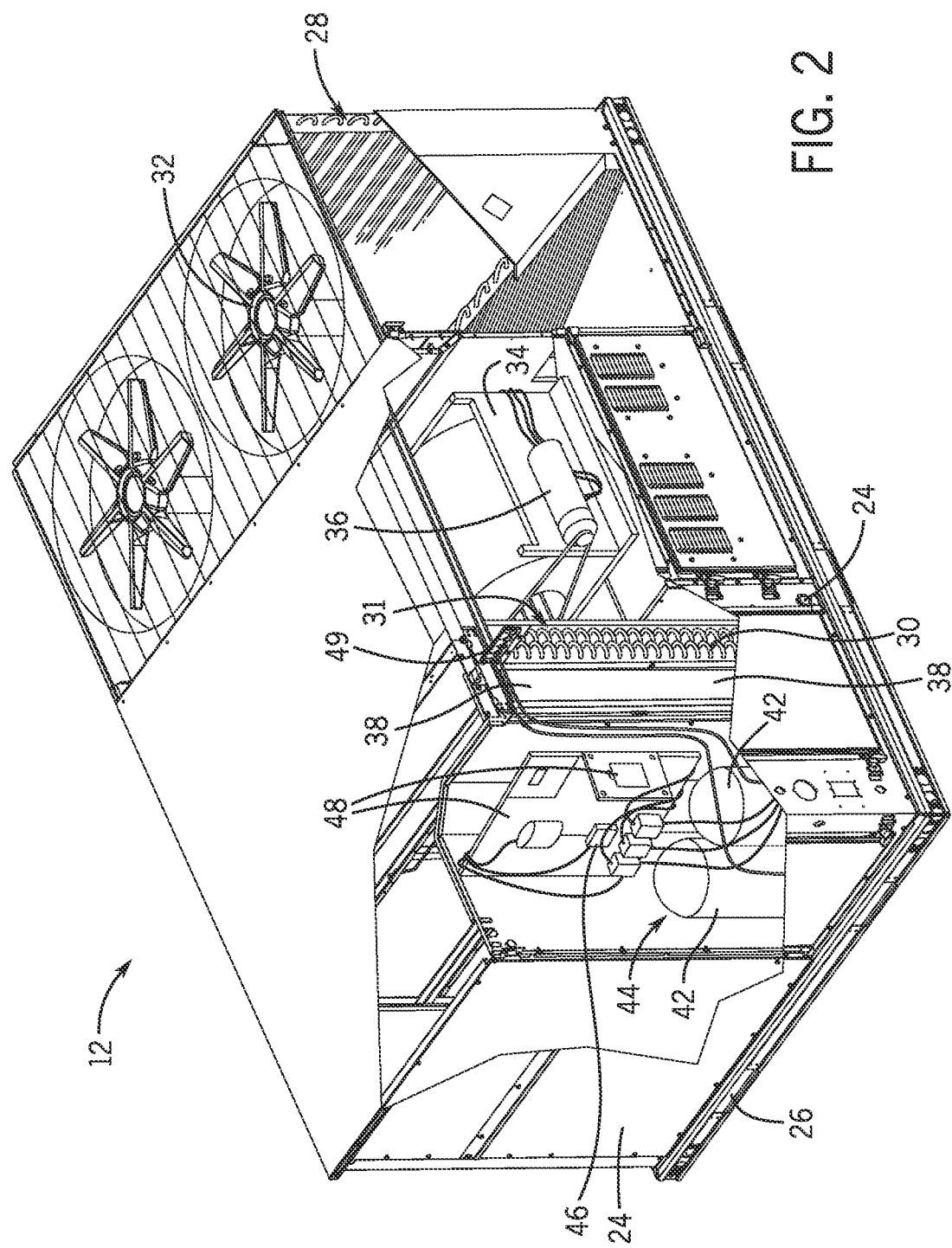
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
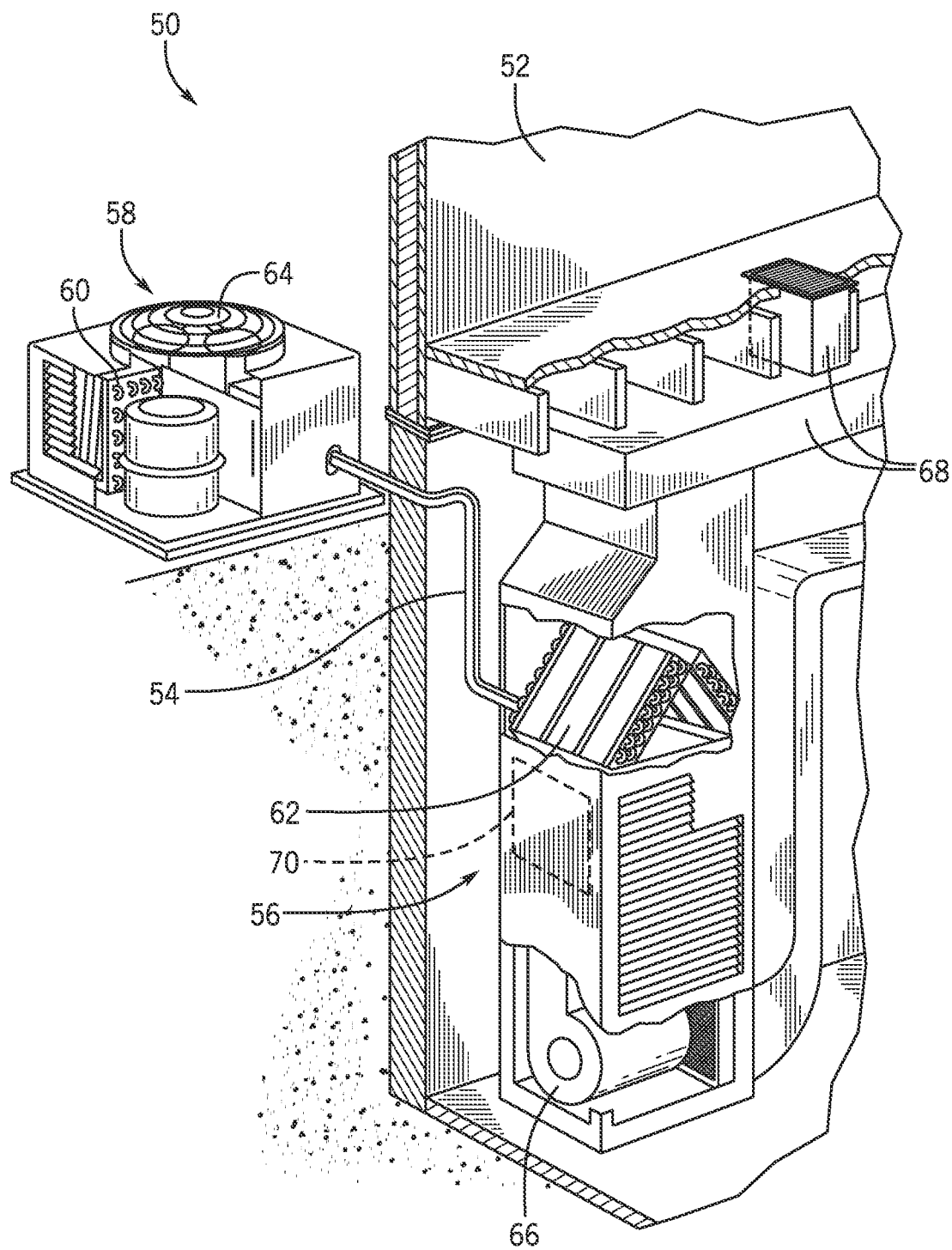
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
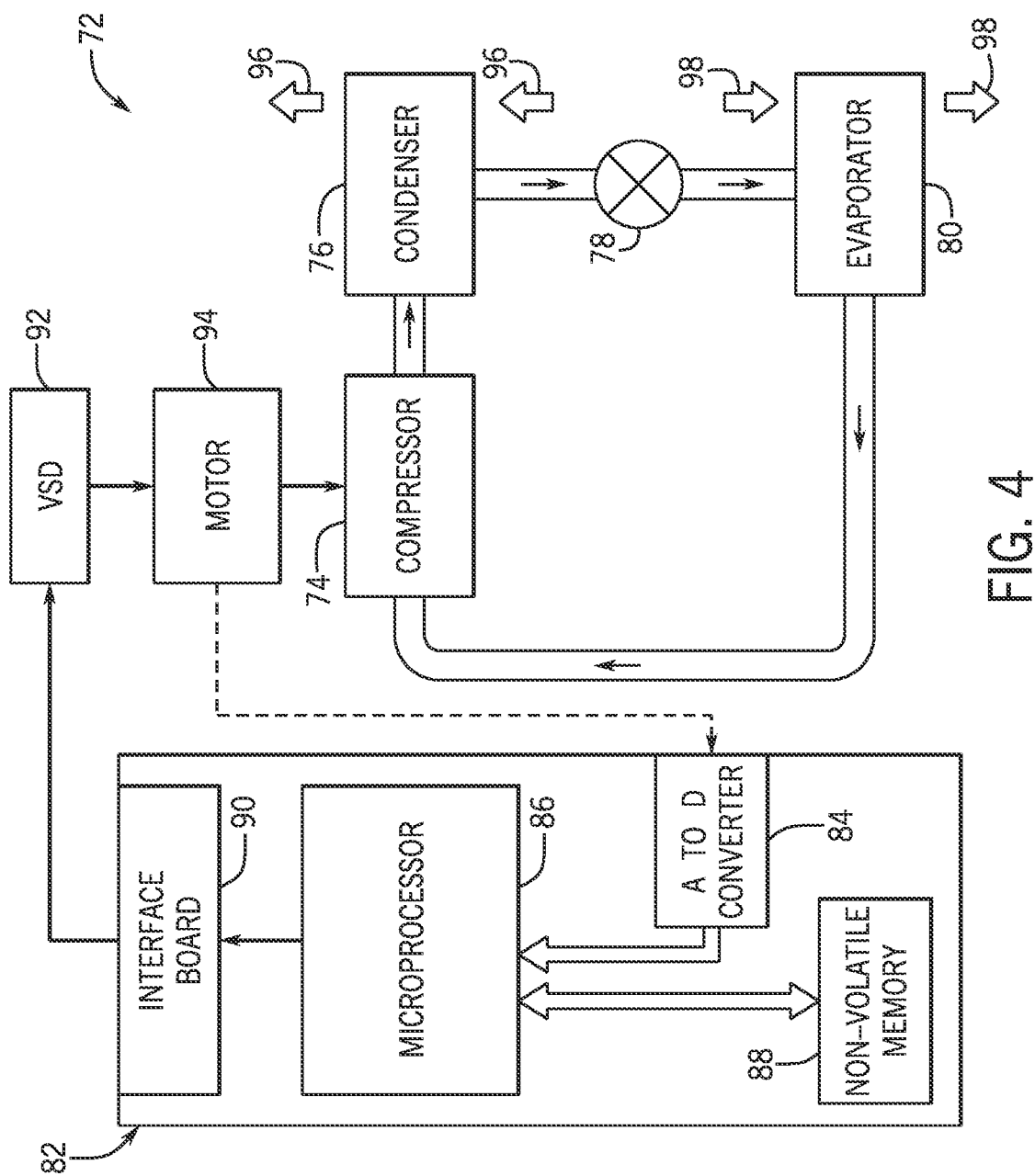
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

In certain embodiments, an HVAC system may be controlled by a control system, such as the control panel 82. The control system may include primary control circuitry and secondary control circuitry. The primary control circuitry may be configured to store core control logic, such as in a primary memory, and the secondary control circuitry may be configured to store operating data, such as in a secondary memory. The primary control circuitry may include a processor configured to retrieve the operating data stored in the secondary memory and use the operating data with the core control logic as a combined or overall control scheme to operate the HVAC system. For example, the processor may be configured to determine a setting or mode to which a component is to be operated in response to a received control input based on the operating data, and the processor may determine a control output to be transmitted to operate the component at the setting via the core control logic. During an update to the control system, the operating data may be updated, but the core control logic may not be changed. For example, after the operating data has been updated in the secondary memory, the processor may retrieve updated operating data stored in the secondary memory and use the updated operating data with the same core control logic stored in the primary control circuitry to operate the HVAC system. As such, the update to the control system may limit a modification to an overall control scheme used by the processor to operate the HVAC system. As a result, the control system may more readily operate the HVAC system after the update, and/or a likelihood of errors being introduced to the control scheme as a result of the update may be reduced. Thus, operation of the HVAC system via the control system may be improved.

Figure 5:
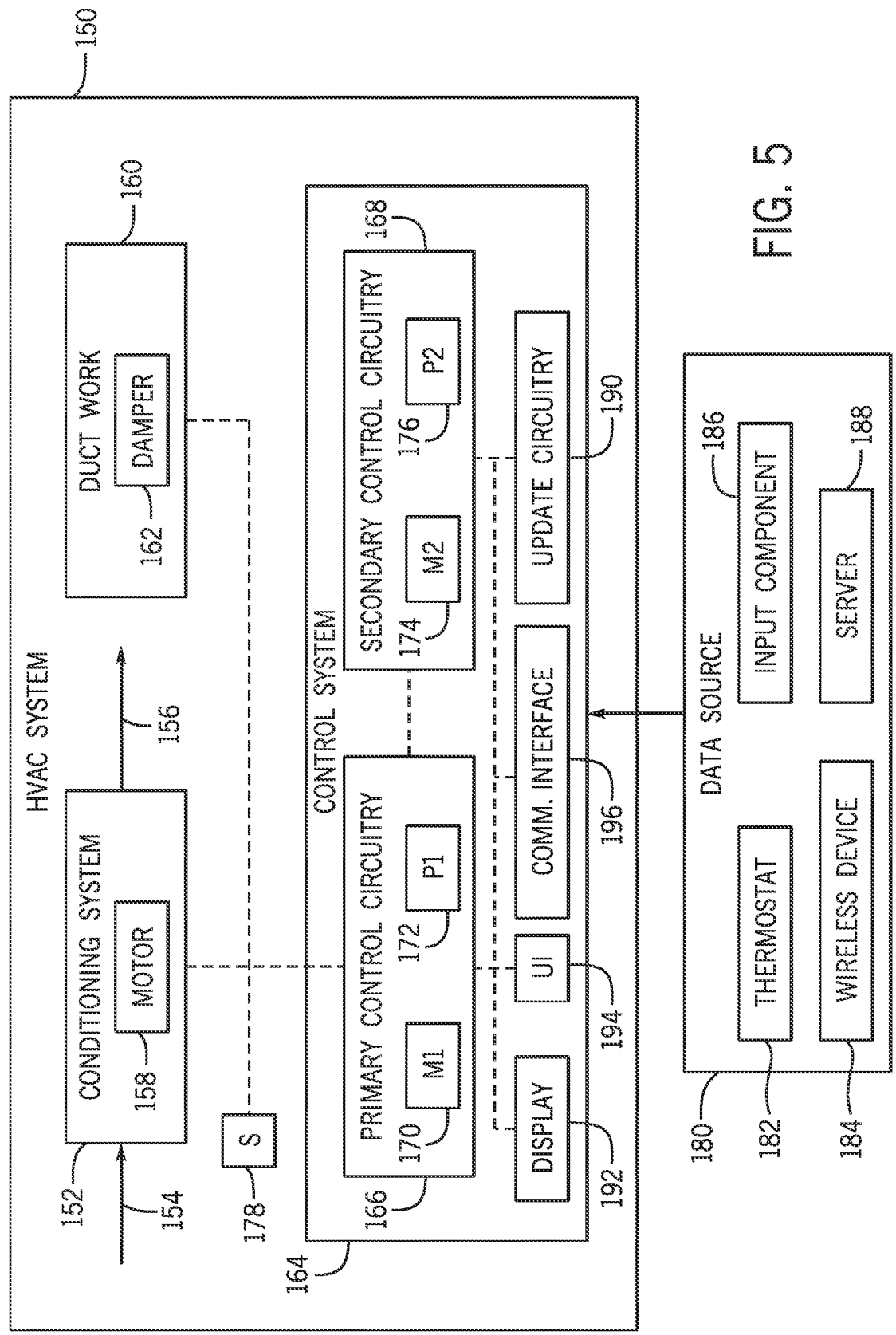
FIG. 5 is a schematic diagram of an embodiment of a heating, ventilation, and/or air conditioning (HVAC) system with a control system, according to an aspect of the present disclosure.

With the preceding in mind, FIG. 5 is a schematic diagram of an embodiment of an HVAC system 150 configured to condition an air flow and/or a space (e.g., a space of the building 10). For example, the HVAC system 150 may include a conditioning system 152, which may receive an intake air flow 154, such as from the space and/or from an outdoor or ambient environment, condition the intake air flow 154, and deliver the conditioned air flow as a supply air flow 156 to the space, thereby conditioning the space. By way of example, the conditioning system 152 may cool, heat, and/or dehumidify the intake air flow 154 and/or the space. In some embodiments, the conditioning system 152 may include the vapor compression system 72 configured to pressurize a refrigerant via the compressor 74, cool the refrigerant via the condenser 76, and place the refrigerant in a heat exchange relationship with the intake air flow 154 via the evaporator 80 to condition the intake air flow 154. In additional or alternative embodiments, the conditioning system 152 may include another system or component (e.g., the furnace 70) configured to place a different fluid, such as a process fluid, water, glycol, ambient air, combustion products, and so forth, in a heat exchange relationship with the intake air flow 154 to condition the intake air flow 154.

Indeed, the HVAC system 150 may include various components configured to operate to provide the HVAC system 150 with conditioning capabilities. As an example, the conditioning system 152 may include a motor 158 (e.g., the motor 94), which may drive operation of another component of the HVAC system 150, such as the compressor 74 and/or a fan (e.g., the blower 66, a fan of the condenser 76). Operation of the motor 158 may be regulated to control conditioning provided by the conditioning system 152 to the intake air flow 154. The HVAC system 150 may also include ductwork 160 (e.g., the ductwork 68) through which an air flow, such as the intake air flow 154 and/or the supply air flow 156, may be directed. The ductwork 160 may include one or more dampers 162, which may control a flow rate of the air flow through the ductwork 160. By way of example, operation of the damper(s) 162 may be regulated to control the flow of the supply air flow 156 directed into the space, thereby controlling conditioning of the space.

The HVAC system 150 may further include or be communicatively coupled to a control system 164 (e.g., an automation controller, a programmable controller) configured to operate the HVAC system 150 (e.g., to condition the intake air flow 154, to condition the space). The illustrated control system 164 includes primary control circuitry 166 (e.g., a first microchip) and secondary control circuitry 168 (e.g., a second microchip) communicatively coupled to one another. Each of the primary control circuitry 166 and the secondary control circuitry 168 may include a respective memory and processor (e.g., processing circuitry). For example, the primary control circuitry 166 may include a primary memory 170 and a primary processor 172, and the secondary control circuitry 168 may include a secondary memory 174 and a secondary processor 176. Each of the memories 170, 174 may include a non-transitory, computer-readable medium that may include volatile memory, such as random-access memory (RAM), and/or non-volatile memory, such as read-only memory (ROM), flash memory, optical drives, hard disc drives, solid-state drives, or any other suitable non-transitory computer-readable medium storing instructions that, when executed by the respective processor 172, 176, may control operation of the HVAC system 150. To this end, each of the processors 172, 176 may include one or more application specific integrated circuits (ASICs), one or more field programmable gate arrays (FPGAs), one or more programmable logic devices (PLD), one or more programmable logic arrays (PLA), one or more general purpose processors, or any combination thereof configured to execute such instructions.

The primary control circuitry 166 and the secondary control circuitry 168 may operate independently of one another. For example, each of the processors 172, 176 may perform separate operations, such as to execute respective instructions separately from one another. Additionally, each of the memories 170, 174 may be separate from one another and may store different information, such as data, instructions, code, and so forth. The information stored in one of the memories 170, 174 may be changed or updated without affecting the information stored in another one of the memories 170, 174. Indeed, the memories 170, 174 may be configured to store different information, and the processors 172, 176 may utilize the information stored in each of the memories 170, 174 to operate the HVAC system 150.

In some embodiments, the primary control circuitry 166 and the secondary control circuitry 168 may be disposed on the same circuit medium (e.g., the same circuit board) of the control system 164. As an example, the secondary control circuitry 168 may be removably coupled to the circuit medium. That is, the secondary memory 174 and/or the secondary processor 176 may be physically and/or communicatively decoupled from the control system 164. For instance, the secondary memory 174 and/or the secondary processor 176 may plug into a header of the circuit medium. As another example, the secondary control circuitry 168 may be integral to, built in with, or permanently positioned within the control system 164 (e.g., soldered to the circuit medium). As a further example, the primary control circuitry 166 and the secondary control circuitry 168 may include shared or common circuitry. For instance, the primary memory 170 and the secondary memory 174 may be separate partitions of the same memory. In additional or alternative embodiments, the primary control circuitry 166 and the secondary control circuitry 168 may be a part of separate circuit mediums, such as circuit mediums positioned at different locations of the HVAC system 150.

The primary control circuitry 166 (e.g., the primary processor 172) may be configured to operate certain components of the HVAC system 150, such as the motor 158, another component of the conditioning system 152, the damper 162, any other suitable component of the HVAC system 150, or any combination thereof, using a control scheme. For instance, the primary control circuitry 166 may store executable instructions that include core control logic, which may define control outputs (e.g., control signals) transmissible during operation of the HVAC system 150, such as based on a received control input. As an example, the core control logic may define control outputs transmissible to drive operation of a particular component in response to a control input (e.g., a control output to energize an inducer during a received call for cooling), associate control outputs for each of a plurality of operating parameters of the component (e.g., a respective control output to energize the inducer at each of a plurality of levels), control outputs to update the control system 164, control outputs in response to a determined status of the HVAC system 150 (e.g., a fault detection, an operating status), and/or control outputs to communicate with another communicating component (e.g., a thermostat, master communicating software). The core control logic may also ensure proper operation of the HVAC system 150, such as operation of the components of the HVAC system 150 to satisfy regulations, building codes, criteria, guidelines, and/or standards. For example, the control outputs defined by the core control logic may cause operation of the components of the HVAC system 150 within respective ranges of operating parameter values to enable the HVAC system 150 to be properly operated, and the core control logic may block operation of the components outside of the corresponding range of operating parameter values to block undesirable operation of the HVAC system 150.

The secondary control circuitry 168 may be configured to store operating data (e.g., within the secondary memory 174) referenced by the primary control circuitry 166 to operate the HVAC system 150. For example, the operating data may indicate a specific operating parameter, level, mode, or setting based on which a component is to be operated. The operating parameter may include an operating value associated with a component (e.g., an energization value of an inducer), a flow rate of air flow, a type of refrigerant directed by the HVAC system 150 (e.g., in the conditioning system 152), and the like. In this manner, the core control logic and the operating data may be cooperatively used to operate the HVAC system 150. By way of example, the primary control circuitry 166 (e.g., the primary processor 172) may retrieve or access the operating data from the secondary memory 174 to determine a particular operating parameter associated with a component (e.g., a particular speed of the motor 158) and to be effectuated in response to a received control input. In some embodiments, the operating data may be stored in a table, such as a database table, and the primary control circuitry 166 may retrieve the values from the table. The primary control circuitry 166 may also retrieve or access the core control logic from the primary memory 170 to transmit a specific control output based on the particular operating parameter (e.g., to cause the motor 158 to operate at the particular speed). Thus, the primary control circuitry 166 may operate using an overall control scheme that may be formed from the core control logic and the operating data.

The HVAC system 150 may also include a sensor 178 configured to monitor an operating parameter. The primary control circuitry 166 may be configured to receive sensor data (e.g., control input) from the sensor 178, the sensor data being indicative of the operating parameter. The primary control circuitry 166 may operate the HVAC system 150 based on the sensor data, such as by comparing a monitored value received from the sensor data with a target value (e.g., defined by the core control logic and/or the operating data) and operating the HVAC system 150 to adjust the monitored value toward the target value. By way of example, the sensor 178 may be configured to monitor an operating parameter associated with a component operated by the control system 164, an operating parameter associated with an air flow (e.g., the intake air flow 154, the supply air flow 156), an operating parameter associated with the space, an operating parameter associated with a refrigerant, another suitable operating parameter, or any combination thereof. Thus, the control system 164 may receive the sensor data from the sensor 178 and transmit a corresponding control output (e.g., as defined by the core control logic and the operating data) based on the received sensor data.

The primary control circuitry 166 may also verify or validate the operating data retrieved from the secondary control circuitry 168. In an example, the primary control circuitry 166 may store ranges of values for different operating parameters, each range of values indicating expected, appropriate, or suitable operating parameter values that may be used for operating the HVAC system 150. For instance, each range of values may include operating parameter values that enable desirable or proper operation of the HVAC system 150 (e.g., to satisfy or comply with regulations, codes, criteria, guidelines, standards) and/or of individual components of the HVAC system 150 (e.g., based on a design specification or operating limits of the components). That is, operating the HVAC system 150 based on operating data that is within the ranges of values may enable desirable operation of the HVAC system 150. The core control logic may cause the primary control circuitry 166 to compare the operating data retrieved from the secondary memory 174 with the corresponding ranges of values stored in the primary control circuitry 166 to confirm that the primary control circuitry 166 is to operate the HVAC system 150 based on the retrieved operating data. Indeed, the primary control circuitry 166 may block usage of operating data that includes a value outside of a corresponding range of value to block undesirable operation of the HVAC system 150 and/or of the components of the HVAC system 150. Thus, verification of the operating data or subsequent updates to the operating data may enable desirable operation of the HVAC system 150 upon retrieval from the secondary control circuitry 168 and usage to operate the HVAC system 150.

In another example, the primary control circuitry 166 may verify the operating data during operation of the HVAC system 150. For instance, the primary control circuitry 166 may confirm that the operating data has been properly retrieved and/or stored in the primary control circuitry 166. In some embodiments, the primary control circuitry 166 may copy the operating data upon retrieval from the secondary control circuitry 168 and separately store the copies of the operating data in the primary memory 170. During a conditioning cycle of the HVAC system 150, the primary control circuitry 166 may select one of the copies of the operating data for usage with the core control logic to operate the HVAC system 150. The primary control circuitry 166 may also perform a validation process or technique (e.g., a cyclic redundancy check (CRC)) on the copies of the operating data to determine whether the copies are valid and have been properly retrieved and/or stored. As an example, the validation process may enable the primary control circuitry 166 to determine whether inadvertent changes or errors were introduced to a copy of the operating data (e.g., during retrieval and/or storage of the operating data) and to verify the copies of the operating data are consistent with or match one another. In response to a determination that a copy is invalid, the primary control circuitry 166 may erase the currently stored copies of the operating data and retrieve the operating data from the secondary control circuitry 168 again for subsequent storage and verification.

The secondary processor 176 may also be configured to operate the HVAC system 150. For example, the secondary processor 176 may be configured to communicate with the primary control circuitry 166 (e.g., the primary memory 170, the primary processor 172), such as to transmit the operating data from the secondary memory 174 to the primary memory 170. Additionally or alternatively, the secondary processor 176 may be configured to operate other aspects of the HVAC system 150, such as to control operation of certain components of the HVAC system 150 that are not being controlled by the primary control circuitry 166 (e.g., based on the operating data stored in the secondary memory 174).

In some embodiments, the core control logic stored in the primary control circuitry 166 may be substantially the same for different HVAC systems 150, such as HVAC systems 150 of different models, embodiments, types, configurations, or design specifications. For example, control systems 164 of different HVAC systems 150 may utilize a set of common control outputs to cause operation of the HVAC systems 150. In other words, the respective control outputs used to operate (e.g., to effectuate a particular operating mode of) components of different HVAC systems 150 may be the same or substantially the same. However, the operating data may be different for different models, embodiments, types, configurations, or design specifications of the HVAC system 150. As an example, the specific operating parameter of a component of the HVAC system 150 may be defined to enable efficient operation of the particular HVAC system 150 based on the application of the HVAC system 150, the design or structure of other components incorporated in the HVAC system 150, user-defined or preferred settings, and so forth. Thus, the operating data being referenced by the respective primary control circuitry 166 implemented in different HVAC systems 150 may be different. As an example, in embodiments in which the operating data is stored in a table, a different set of operating parameters may be defined for each model of the HVAC system 150, and a particular set of operating parameters may be selected from the operating data for operation based on the specific model of the HVAC system 150 in which the control system 164 is implemented.

Additionally, the operating data stored in the secondary control circuitry 168 and referenced by the primary control circuitry 166 may be adjusted, modified, or otherwise updated. For instance, the update may include adjustment of an operating parameter (e.g., a speed of the motor 158 in response to a received control input) to enable more efficient operation of the HVAC system 150. By way of example, prior to the update of the operating data, the primary control circuitry 166 may retrieve an initial operating parameter value (e.g., a first speed of the motor 158) from the secondary control circuitry 168 and operate the HVAC system 150 (e.g., transmit a first control output) according to the core control logic and the initial operating parameter value. After an update to the operating data to adjust the initial operating parameter value to an adjusted operating parameter value (e.g., a second speed of the motor 158), the primary control circuitry 166 may retrieve the adjusted operating parameter value from the secondary control circuitry 168 and operate the HVAC system 150 (e.g., transmit a second control output) according to the core control logic and the adjusted operating parameter value. The update to the operating data may not substantially affect the core control logic of the primary control circuitry 166. For example, the core control logic may already define the first control output used to operate the HVAC system 150 based on the initial operating parameter value and the second control output used to operate the HVAC system 150 based on the adjusted operating parameter value. In response to the update to the operating data, the primary control circuitry 166 may select the second control output instead of the first control output defined by the same core control logic for transmission.

Moreover, upon update of the operating data, the updated operating data may be retrieved from the secondary control circuitry 168 and compared to the ranges of operating values stored in the primary control circuitry 166. Upon verification that the updated operating data enables desirable operation of the HVAC system 150 (e.g., the operating data is within the ranges of operating values), the control system 164 may operate the HVAC system 150 based on the updated operating data. Since the core control logic may not be modified based on the update to the operating data and the unmodified core control logic may ensure desirable operation of the HVAC system 150, the operating data may be updated without re-testing operation of the HVAC system 150. As such, the control system 164 may readily operate the HVAC system 150 and reduce a period of time in which operation of the HVAC system 150 is unavailable as a result of an update to the control system 164, thereby improving updating operation of the HVAC system 150 (e.g., improve customer experience associated with operation of the HVAC system 150, improve development and/or implementation of updated HVAC system 150 operations).

Indeed, instead of using a control scheme that may directly integrate or interweave (e.g., hard code) the core control logic and the operating data together (e.g., into the same software code), the core control logic and the operating data may be separate and independent of one another. That is, different control systems 164 may each use a common core control logic and a particular set of operating data to operate a corresponding HVAC system 150. As such, instead of developing a single control scheme for each HVAC system 150 to incorporate both the common core control logic and the particular set of operating data, in which an entirety of the control scheme may be different or unique for different HVAC systems 150, each control system 164 of a different HVAC system 150 may store the same core control logic and, separately, specific operating data. In other words, the operating data may be particularly developed, selected, and/or implemented for each HVAC system 150, while the same core control logic may be utilized with a variety of HVAC systems 150. Thus, a cost and/or complexity associated with development of the control scheme for different HVAC systems 150 may be reduced, and configurability of the control scheme for various HVAC systems 150 may be improved. Separating the core control logic and the operating data may further enable the operating data to be adjusted without affecting the core control logic. As such, the update to the control system 164 may modify a smaller portion of the overall control scheme used to operate the HVAC system 150 as compared to a control system using integrated core control logic and operating data. Thus, updating the control system 164 may reduce a likelihood of introducing errors, bugs, and/or glitches to the operation of the control system 164 associated with modification of the control scheme (e.g., of software code). Thus, operation of the HVAC system 150 associated with the update to the control system 164 may be further improved.

In certain embodiments, the primary control circuitry 166 (e.g., the primary processor 172) may identify receipt of an update (e.g., a software update, a firmware update) to the control scheme used by the control system 164 (e.g., to the operating data). The update may be received via a data source 180. The data source 180 may, for example, include a thermostat 182 (e.g., a communicating thermostat, a master device), a wireless device 184 (e.g., a mobile phone, a desktop computer, a laptop computer, a tablet), an input component 186 (e.g., a Universal Serial Bus, a Secure Digital card, a memory card), a server 188 (e.g., a cloud server, a physical server, a remote server), another suitable component (e.g., another controller), or any combination thereof. The control system 164 may include system update circuitry 190 (e.g., serial flash) communicatively coupled to the primary control circuitry 166 and/or the secondary control circuitry 168 and configured to receive the update. The primary control circuitry 166 may determine receipt of the update via the system update circuitry 190 and may enable the operating data stored in the secondary control circuitry 168 to be updated based on the update received via the system update circuitry 190. In an example embodiment, the primary control circuitry 166 may verify that the HVAC system 150 is in an update configuration when the update is received to confirm that the received update is to be implemented (e.g., to update the operating data stored in the secondary control circuitry 168). For instance, the primary control circuitry 166 may block the operating data from being inadvertently updated in response to a determination that the HVAC system 150 is not in the update configuration when the update is received.

In some embodiments, the primary control circuitry 166 may retrieve the operating data stored in the secondary control circuitry 168 during a particular operation of the HVAC system 150, such as in response to a determined update to the control system 164 and/or during a power-up or start-up operation of the HVAC system 150 (e.g., during initiation of the operation of the HVAC system 150, when power is initially supplied to the HVAC system 150). Indeed, the primary control circuitry 166 may temporarily store the retrieved operating data in the primary memory 170 (e.g., in volatile memory of the primary memory 170). In an example, the primary control circuitry 166 may communicate with the secondary control circuitry 168 to retrieve updated operating data (e.g., from the secondary memory 174), overwrite previously stored operating data in the primary memory 170 with the updated operating data, and operate the HVAC system 150 based on the updated operating data in response to the determined update to the control system 164. In another example, the stored operating data may be erased from the primary memory 170 after the HVAC system 150 is powered down (e.g., operation of the HVAC system 150 is suspended, power supply to the HVAC system 150 is interrupted) and/or after the HVAC system 150 restarts. In a subsequent power-up operation, the primary control circuitry 166 may communicate with the secondary control circuitry 168 again to retrieve the operating data for storage in the primary memory 170. In this way, communication between the primary control circuitry 166 and the secondary control circuitry 168 may be limited to specific instances during operation of the HVAC system 150 to avoid continual communication between the primary control circuitry 166 and the secondary control circuitry 168 (e.g., continual retrieval of the operating data stored in the secondary control circuitry 168). In certain embodiments, the operating data may be stored in non-volatile memory of the secondary memory 174. As such, the operating data may not be erased from storage in the secondary memory 174 upon powering down or resetting operation of the HVAC system 150, and the secondary memory 174 may not be operated after each power down or reset of the HVAC system 150 to re-store the operating data. Thus, usage of the secondary control circuitry 168 may be limited to reduce an impact on a lifespan of the secondary control circuitry 168.

The control system 164 may further include other components and features to facilitate operation of the HVAC system 150. As an example, the control system 164 may include a display 192. The display 192 may be operated to present visual information, such as a fault of the HVAC system 150, an operating status of the HVAC system 150, a detected operating parameter, other suitable information, or any combination thereof. As another example, the control system 164 may include a user interface 194 with which a user, such as a technician, an operator, a customer, and so forth, associated with the HVAC system 150 may interact. For instance, the user may provide a user input via the user interface 194 to adjust an operation of the HVAC system 150, such as to manually change the conditioning provided by the HVAC system 150, provide an update to the operating data, and the like. As a further example, the control system 164 may include a communication interface 196 that may be used for communicatively coupling the control system 164 to another device, such as to the data source 180 (e.g., to enable the input component 186 to physically couple to the control system 164). To this end, the communication interface 196 may, for instance, include a physical interface, such as a Universal Serial Bus port, a memory card slot, a wire terminal, and the like. The communication interface 196 may additionally or alternatively include a wireless interface, such as a wireless connectivity module, an antenna, a transmitter, a receiver, a transceiver, and the like, configured to enable the control system 164 to communicate wirelessly, such as via a wireless network (e.g., Wi-Fi, a cellular network, the Internet). The display 192, the user interface 194, and/or the communication interface 196 may be communicatively coupled to any combination of the primary control circuitry 166 and the secondary control circuitry 168.

Although the illustrated HVAC system 150 includes a single control system 164 having a single primary control circuitry 166 and a single secondary control circuitry 168, an additional or alternative embodiment of the HVAC system 150 may include any suitable number of control systems 164 (e.g., any suitable number of circuit mediums) having any suitable number of primary control circuitries 166 and secondary control circuitries 168. By way of example, the residential heating and cooling system 50 may include a first control system (e.g., to control the indoor unit 56) with first primary control circuitry and first secondary control circuitry, a second control system (e.g., to control the outdoor unit 58) with second primary control circuitry and second secondary control circuitry, and/or a third control system (e.g., to control the furnace 70) with third primary control circuitry and third secondary control circuitry. In additional or alternative embodiments, the control system 164 may include a single processor (e.g., the primary processor 172 may be configured to perform operations associated with the illustrated secondary processor 176) communicatively coupled to separate memories (e.g., the primary memory 170, the secondary memory 174) and configured to retrieve the core control logic from the primary memory 170 and the operating data from the secondary memory 174 to operate the HVAC system 150. Indeed, the HVAC system 150 may include any suitable configuration of control circuitries to perform the techniques described herein.

Each of FIGS. 6-8 described below illustrates a respective method or process for operating the HVAC system 150. In some embodiments, each method may be performed by a single component or system, such as the primary processor 172 of the primary control circuitry 166. In additional or alternative embodiments, multiple components or systems may perform the steps for each of the methods. It should also be noted that additional steps may be performed with respect to each depicted method. Moreover, certain steps of each depicted method may be removed, modified, and/or performed in a different order.

Figure 6:
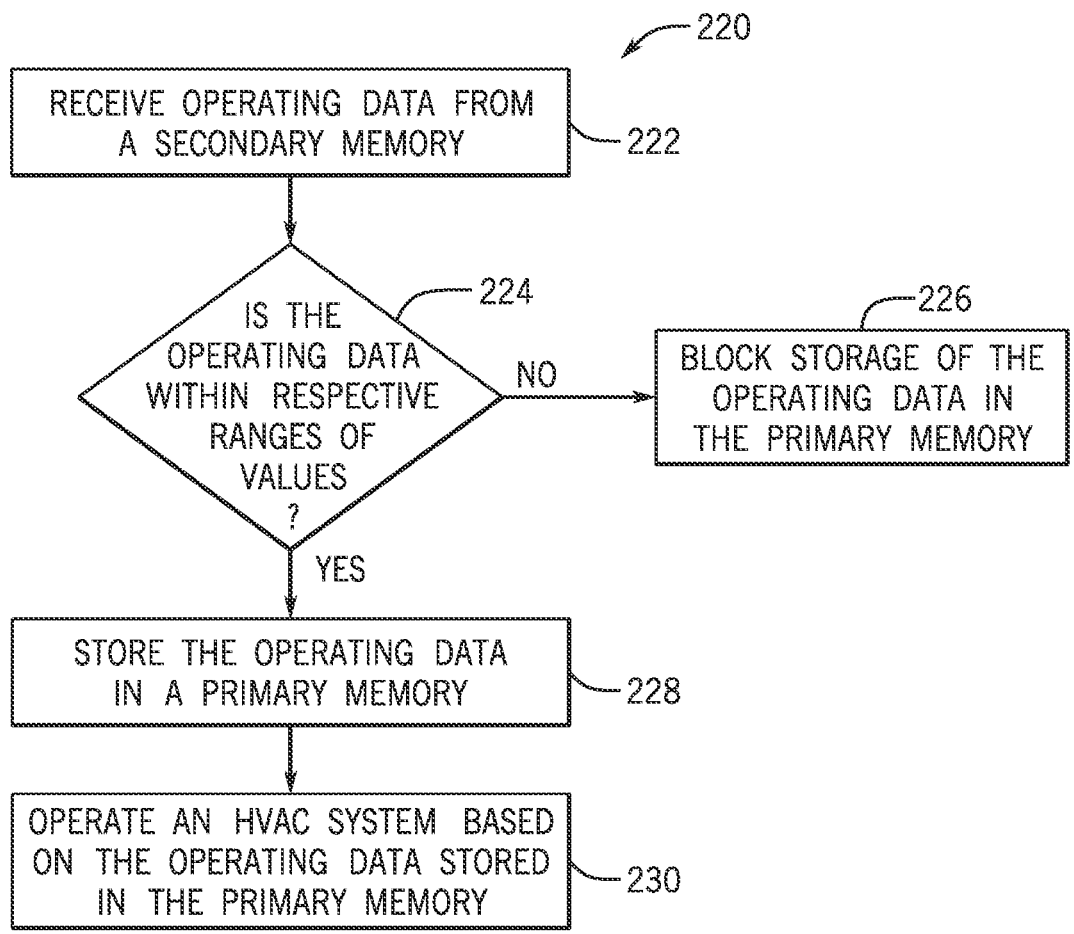
FIG. 6 is a flowchart of an embodiment of a method or process for obtaining operating data used to operate an HVAC system, according to an aspect of the present disclosure.
Figure 7:
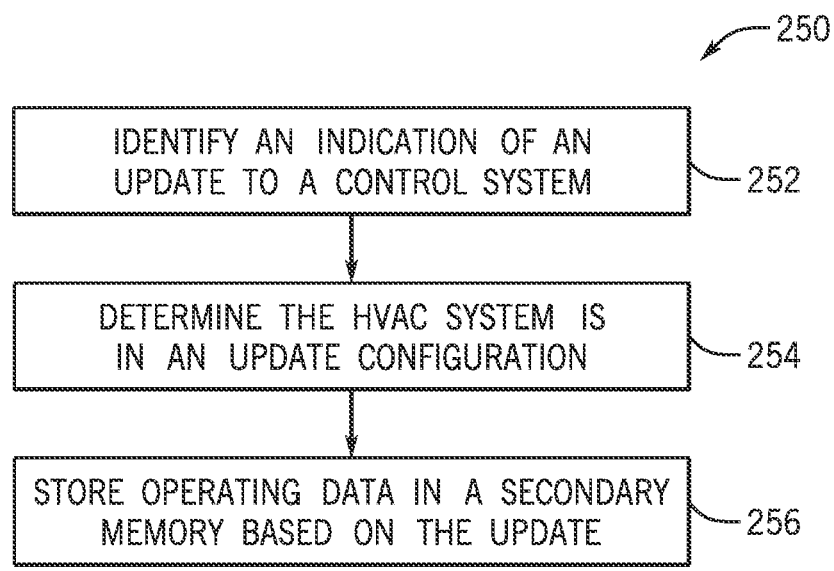
FIG. 7 is a flowchart of an embodiment of a method or process for updating operating data used to operate an HVAC system, according to an aspect of the present disclosure.

FIG. 6 is a flowchart of an embodiment of a method or process 220 for obtaining operating data used to operate the HVAC system 150. In some embodiments, the method 220 may be performed at a predetermined instance of the operation of the HVAC system 150, such as during a power-up operation and/or in response to a received update (e.g., an update to the operating data). At block 222, operating data may be received or retrieved from the secondary memory 174. For example, the operating data may be retrieved from non-volatile memory of the secondary memory 174. At block 224, in response to receiving the operating data, the operating data may be compared with ranges of values, which may be stored in the primary memory 170. For example, the operating data may include respective values for operating parameters used to operate the HVAC system 150, and the ranges of values may be associated with respective expected, appropriate, or suitable values associated with the operating parameters. Thus, a determination may be made regarding whether the received operating data may enable desirable operation of the HVAC system 150 based on the comparison between the operating data with the ranges of values.

At block 226, in response to a determination that the operating data, such as a value of an operating parameter defined by the operating data, is not within a corresponding the range of values, the operating data received from the secondary memory 174 may be blocked from storage in the primary memory 170. For example, operation of the HVAC system 150 based on operating data that is outside of the ranges of values may cause undesirable operation of the HVAC system 150. Thus, blocking storage of such operating data in the primary memory 170, and therefore blocking operation based on such operating data, may also block undesirable operation of the HVAC system 150. In some embodiments, a notification may be presented (e.g., via the display 192) to inform a user that the operating data received from the secondary memory 174 is not within the ranges of values. The notification may cause the user to inspect the operating data stored in the secondary memory 174, such as to determine whether the operating data (e.g., received based on an update) is faulty.

At block 228, in response to a determination that the operating data is within the ranges of values, the operating data may be stored in the primary memory 170. In certain embodiments, the operating data may be temporarily stored in the primary memory 170 (e.g., in volatile memory). That is, the operating data may be erased in response to powering down and/or resetting the operation of the HVAC system 150. At block 230, the HVAC system 150 may be operated based on the operating data, such as based on the values of the operating parameters defined by the operating data, stored in the primary memory 170. Indeed, the operating data may be incorporated in and/or used with core control logic stored in the primary memory 170 to create a combined control scheme, and the HVAC system 150 may be operated based on the combined control scheme. That is, a control output defined by the core control logic may be transmitted in accordance with the operating data. For example, an operating parameter value may be identified in accordance with the operating data, and a control output corresponding to the operating parameter value may be transmitted in accordance with the core control logic. After the operating data has been stored in the primary memory 170, the operating data may be retrieved from the primary memory 170 instead of from the secondary memory 174 to operate the HVAC system 150. In this manner, usage of the secondary memory 174 may be limited after storage of the operating data in the primary memory 170.

As described herein, the operating data stored in the secondary memory 174 and used to operate the HVAC system 150 may be updated without substantially modifying the core control logic stored in the primary memory 170. With this in mind, FIG. 7 is a flowchart of an embodiment of a method or process 250 for updating the operating data. The method 250 may be performed, for instance, while a current set of operating data is stored in the secondary memory 174. At block 252, an indication of an update to the control system 164 (e.g., to the control scheme used by the control system 164) may be identified. By way of example, the indication may be identified based on communication with the system update circuitry 190, which may have received the update via the data source 180. Indeed, the update may be wirelessly received (e.g., via the wireless device 184, via a wireless network) and/or received via a component physically attached to the control system 164 (e.g., via the input component 186).

In response to identifying the indication of the update, the configuration of the HVAC system 150 may be determined. At block 254, a determination is made that the HVAC system 150 is in an update configuration. As an example, the update configuration may include a power-up operation of the HVAC system 150. As another example, determining that the HVAC system 150 is in the update configuration may include a verification that certain procedural steps have been performed (e.g., at the power-up operation of the HVAC system 150). For instance, the verification may include determining that an approved version of the update has been received, such as that the input component 186 is physically connected to the communication interface 196 and that the update is received from the input component 186. In this way, a determination may be made that the update includes operating data that has been generated from a verified or reliable source. The verification may also include determining that the HVAC system 150 is in a desirable operating mode. The desirable operating mode may include an operating mode that blocks conditioning operations of the HVAC system 150 to satisfy conditioning calls, such as an operating mode (e.g., caused by providing 24 volts of alternating current are being applied to a conventional thermostat G input) in which a fan of the HVAC system 150 is in operation to deliver the supply air flow 156 without operation of a remainder of the conditioning system 152. Thus, the update configuration of the HVAC system 150 may block the update from impacting a current conditioning operation of the HVAC system 150. The verification may further include determining that a particular user input has been received, such as via an interaction with the user interface 194. For instance, a determination may be made that a push button of the user interface 194 has been pressed for a threshold period of time (e.g., 3 seconds, 5 seconds, 7 seconds). In this manner, the update configuration may include a manual step to be performed by the user to confirm that the update to the control system 164 is intentional.

At block 256, in response to determining that the HVAC system 150 is in the update configuration after the indication of the update has been identified, the operating data included in the update may be stored in the secondary memory 174. That is, the update to the control system 164 may be applied to update the operating data stored in the secondary memory 174, such as to overwrite previously stored operating data. As a result, after such operating data has been stored, the operating data may be retrieved from the secondary memory 174 (e.g., for usage with the core control logic), stored (e.g., temporarily stored) in the primary memory 170, and/or used to operate the HVAC system 150 (e.g., as a part of an overall control scheme). In this manner, the update to the control system 164 may not directly modify the core control logic and may, instead, update the operating data used in cooperation with the core control logic. Thus, the HVAC system 150 may be operated by the control system 164 after implementation of the update without performing additional testing or validation.

In some embodiments, in response to determining that the HVAC system 150 is not in the update configuration after the indication of the update has been identified, the operating data included in the update may be blocked from storage in the secondary memory 174. For example, the update may have been received (e.g., by the system update circuitry 190), but it may not yet be desirable for the update to be applied to the HVAC system 150. For instance, the HVAC system 150 may currently be operating to condition the intake air flow 154 and/or the space, and the update may affect the current conditioning operation. Thus, undesirable update of the control system 164 may be blocked. The display 192 may also present a notification to inform that the update has not been implemented, such as that updated operating data has not been stored in the primary memory 170 and/or the secondary memory 174 and/or that the HVAC system 150 is not in the update configuration.

Figure 8:
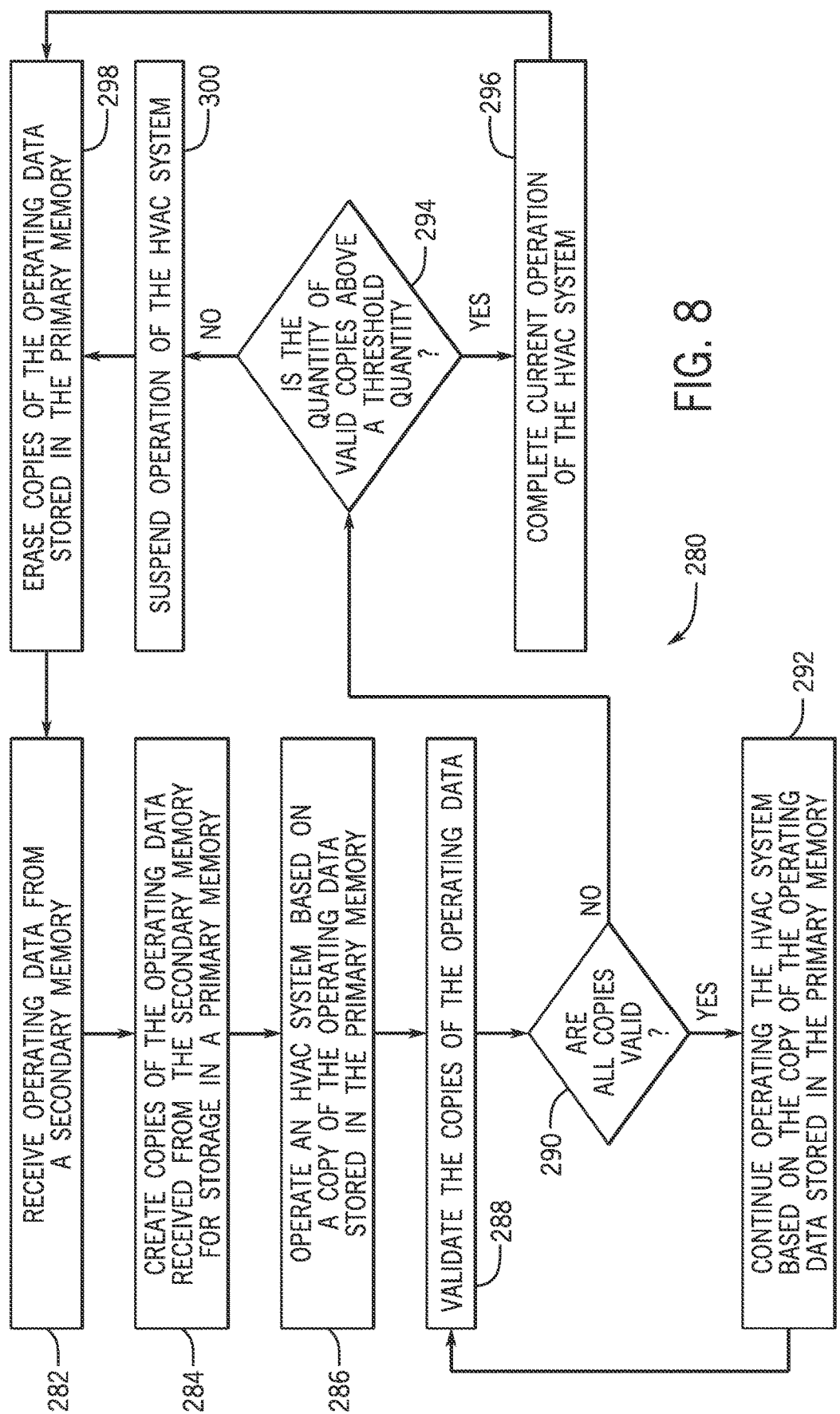
FIG. 8 is a flowchart of an embodiment of a method or process for operating an HVAC system based on validation of operating data, according to an aspect of the present disclosure.

FIG. 8 is a flowchart of an embodiment of a method or process 280 for operating the HVAC system 150 based on validation of operating data. For instance, the method 280 may be performed to verify that the operating data being used to operate the HVAC system 150 is valid. At block 282, operating data may be received from the secondary memory 174. As an example, the operating data may be received during a power-up operation of the HVAC system 150 and/or in response to a determination that an update to the control system 166 has been received. In some embodiments, in response to receiving the operating data, multiple copies of the received operating data may be created and stored in the primary memory 170, as described at block 284. Each of the copies may be stored in volatile memory, for example. In certain embodiments, the operating data may be compared with ranges of values to determine whether the operating data may enable desirable operation of the HVAC system 150 (e.g., as described with respect to block 224 of the method 220), and the copies of the operating data may be created and stored in response to a determination that the operating data is within the ranges of values. At block 286, one of the copies of the operating data stored in the primary memory 170 may be retrieved and used to operate the HVAC system 150, such as by using the copy of the operating data with core control logic.

At block 288, after the copies of the operating data have been stored, such as while the HVAC system 150 is being operated using the selected copy of the operating data, the copies of the operating data may be validated. By way of example, CRC may be performed on the copies of the operating data to determine whether there have been any undesirable changes or errors introduced to the stored copies. During CRC, the copies of the operating data may be compared with one another and/or with the operating data stored in the secondary memory 174 to determine whether the operating data has been desirably or properly transmitted from the secondary memory 174 to the primary memory 170 and/or whether the operating data has been desirably or properly copied and stored in the primary memory 170. For instance, an algorithm (e.g., polynomial division) may calculate a respective value for each copy of the operating data based on the respective information and/or data included in the copies of the operating data. The values may be compared to one another to determine whether the copies of the operating data match one another. Indeed, the values matching one another may indicate that the copies of the operating data match one another and therefore that the copies of the operating data have been desirably transmitted and/or stored.

At block 290, a determination is made regarding whether all copies of the operating data are valid. At block 292, in response to a determination that all copies are valid, the HVAC system 150 may continue to be operated based on the copy of the operating data that was retrieved as described with respect to block 286. For example, the determination that all copies of the operating data are valid may be made in response to a determination that the copies match one another based on the CRC performed on the copies, and control outputs defined by the core control logic may continue to be transmitted in response to determining that all copies are valid.

At block 294, in response to a determination that not all copies of the operating data are valid, a further determination may be made regarding whether the quantity of valid copies is above a threshold quantity. By way of example, the determination that not all copies of the operating are valid may be made in response to a determination that the copies do not match one another based on the CRC performed on the copies, and the quantity of valid copies may be made based on a quantity of the copies that match one another. In an example embodiment, four copies of the operating data may be made, and the threshold quantity may be two copies. Thus, a determination may be made that the quantity of valid copies is above the threshold quantity based on there being three valid copies.

At block 296, in response to a determination that the quantity of valid copies exceeds the threshold quantity, a current or active operation of the HVAC system 150, such as a current operating mode (e.g., a conditioning mode) to satisfy an active call, may be completed. For example, control outputs defined by the core control logic may continue to be transmitted to complete the current operation of the HVAC system 150. After completion of the current operation of the HVAC system 150, the copies of the operating data stored in the primary memory 170 may be erased, as described at block 298. The operating data may then be received again from the secondary memory 174 for storage in the primary memory 170, as described at block 282, and the steps of the method 280 may be repeated. At block 300, in response to a determination that the quantity of valid copies are below the threshold quantity, the current operation of the HVAC system 150 may be suspended (e.g., without completion to satisfy an active call). That is, transmission of the control outputs defined by the core control logic may be blocked to suspend the current operation of the HVAC system 150. The copies of the operating data stored in the primary memory 170 may then be erased, as described at block 298, operating data may be received from the secondary memory 174 for storage in the primary memory 170, as described at block 282, and the steps of the method 280 may be repeated. Thus, undesirable operation of the HVAC system 150, such as based on erroneously transmitted or stored operating data, may be blocked.

The present disclosure may provide one or more technical effects useful in the operation of an HVAC system. For example, the HVAC system may include a control system configured to operate components of the HVAC system. The control system may include primary control circuitry and secondary control circuitry. The primary control circuitry may be configured to store core control logic, and the secondary control circuitry may be configured to store operating data. A processor may be configured to retrieve the core control logic from the primary control circuitry and the operating data from the secondary control circuitry to operate the HVAC system. For example, the processor may identify a setting or mode associated with a component of the HVAC system in accordance with the operating data, and the processor may transmit a control output corresponding to the setting in accordance with the core control logic. The control system may receive an update that changes the operating data without changing or substantially changing the core control logic. For instance, after the update, the processor may identify an updated setting or mode associated with the component of the HVAC system in accordance with updated operating data, and the processor may transmit a control output corresponding to the updated setting in accordance with the unmodified core control logic. The core control logic may also verify desirable or proper operation of the HVAC system based on the updated operating data. As such, the HVAC system may not be tested after the update to the operating data, and the control system may readily operate the HVAC system. Additionally, updating the control system to modify the operating data without modifying the core control logic may limit modifications to an overall control scheme used to operate the HVAC system (e.g., as compared to updating a control system that utilizes a control scheme integrating the core control logic and the operating data together in the same software code), thereby reducing a likelihood that errors are introduced to affect operation of the HVAC system via the control system. Thus, operation of the HVAC system via the control system may be improved. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A control system of a heating, ventilation, and/or air conditioning (HVAC) system, comprising:
a primary memory configured to store core control logic defining a plurality of control outputs transmissible by the control system during operation of the HVAC system;
a secondary memory configured to store operating data defining a plurality of operating parameters associated with the HVAC system, wherein the primary memory and the secondary memory are disposed on a circuit board of the control system; and
processing circuitry communicatively coupled to the primary memory and the secondary memory, wherein the processing circuitry is configured to cause the processing circuitry to operate the HVAC system using the core control logic stored in the primary memory and the operating data stored in the secondary memory.

2. The control system of claim 1, wherein the processing circuitry is configured to:
retrieve the operating data from the secondary memory;
store the operating data in the primary memory in response to retrieving the operating data from the secondary memory; and
operate the HVAC system using the core control logic stored in the primary memory and the operating data stored in the primary memory.

3. The control system of claim 2, wherein the processing circuitry is configured to retrieve the operating data from the secondary memory during a power-up operation of the HVAC system, in response to identifying an update to the control system, or both.

4. The control system of claim 2, wherein the processing circuitry is configured to:
compare the operating data to a range of values in response to retrieving the operating data from the secondary memory;
store the operating data in the primary memory in response to determining that the operating data is within the range of values; and
block storage of the operating data in the primary memory in response to determining that the operating data is outside of the range of values.

5. The control system of claim 1, comprising system update circuitry configured to receive an update to the operating data stored in the secondary memory, wherein the processing circuitry is configured to:
identify receipt of the update via the system update circuitry;
cause the secondary memory to store updated operating data based on the update; and
operate the HVAC system using the core control logic stored in the primary memory and the updated operating data stored in the secondary memory.

6. The control system of claim 5, wherein the processing circuitry is configured to:
determine that the HVAC system is in an update configuration in response to identifying receipt of the update via the system update circuitry; and
cause the secondary memory to store the updated operating data based on the update in response to determining that the HVAC system is in the update configuration.

7. The control system of claim 6, wherein the processing circuitry is configured to determine that the HVAC system is in the update configuration based on receipt of an approved version of the update, a determination that the HVAC system is in a particular operating mode, receipt of a user input, or any combination thereof in response to identifying the receipt of the update.

8. The control system of claim 1, comprising primary control circuitry and secondary control circuitry, wherein the primary control circuitry comprises the primary memory and the processing circuitry, and the secondary control circuitry comprises the secondary memory.

9. The control system of claim 1, wherein the processing circuitry is configured to:
determine an operating parameter of the plurality of operating parameters defined by the operating data; and
transmit a control output of the plurality of control outputs defined by the core control logic and in accordance with the operating parameter.

10. A non-transitory, computer-readable medium comprising instructions, wherein the instructions, when executed by processing circuitry, are configured to cause the processing circuitry to:

retrieve core control logic stored in primary control circuitry of a control system of a heating, ventilation, and/or air conditioning (HVAC) system and first operating data stored in secondary control circuitry of the control system, wherein the core control logic defines a plurality of control outputs transmissible to operate the HVAC system, the first operating data defines a first plurality of operating parameters associated with the HVAC system, and the primary control circuitry and the secondary control circuitry are disposed on a circuit board of the control system;

transmit a first control output of the plurality of control outputs defined by the core control logic based on the first plurality of operating parameters defined by the first operating data;

receive an update to the first operating data stored in the secondary control circuitry;

cause the secondary control circuitry to overwrite the first operating data with storage of second operating data in response to receiving the update, wherein the second operating data defines a second plurality of operating parameters associated with the HVAC system;

retrieve the core control logic and the second operating data; and transmit a second control output of the plurality of control outputs defined by the core control logic based on the second plurality of operating parameters defined by the second operating data.

11. The non-transitory, computer-readable medium of claim 10, wherein the instructions, when executed by the processing circuitry, are configured to cause the processing circuitry to:

create a plurality of copies of the second operating data in response to retrieving the second operating data;

store the plurality of copies of the second operating data in the primary control circuitry; and transmit the second control output of the plurality of control outputs based on the second plurality of operating parameters defined by a copy of the plurality of copies of the second operating data.

12. The non-transitory, computer-readable medium of claim 11, wherein the instructions, when executed by the processing circuitry, are configured to cause the processing circuitry to:

determine that each copy of the plurality of copies of the second operating data is valid; and transmit the second control output to continue a current operation of the HVAC system in response to determining that each copy of the plurality of copies of the second operating data is valid.

13. The non-transitory, computer-readable medium of claim 12, wherein the instructions, when executed by the processing circuitry, are configured to cause the processing circuitry to:

determine that at least one copy of the plurality of copies of the second operating data is not valid;

determine a quantity of valid copies of the plurality of copies of the second operating data;

transmit the second control output to complete the current operation of the HVAC system in response to determining that the quantity of valid copies of the plurality of copies of the second operating data exceeds a threshold quantity; and block transmission of the second control output and suspend the current operation of the HVAC system in response to determining that the quantity of valid copies of the plurality of copies of the second operating data does not exceed the threshold quantity.

14. The non-transitory, computer-readable medium of claim 13, wherein the instructions, when executed by the processing circuitry, are configured to cause the processing circuitry to:

erase the plurality of copies of the second operating data stored in the primary control circuitry in response to determining that at least one copy of the plurality of copies of the second operating data is not valid; and retrieve the second operating data from the secondary control circuitry upon erasing the plurality of copies of the second operating data stored in the primary control circuitry.

15. The non-transitory, computer-readable medium of claim 12, wherein the instructions, when executed by the processing circuitry, are configured to cause the processing circuitry to perform a cyclic redundancy check on the plurality of copies of the second operating data to determine whether the plurality of copies of the second operating data are valid.

16. The non-transitory, computer-readable medium of claim 10, wherein the instructions, when executed by the processing circuitry, are configured to cause the processing circuitry to:

determine a configuration of the HVAC system upon receiving the update; and block storage of the second operating data in response to determining that the HVAC system is not in an update configuration upon receiving the update.

17. A heating, ventilation, and/or air conditioning (HVAC) system, comprising:

a component configured to operate to provide the HVAC system with conditioning capabilities;

secondary control circuitry disposed on a circuit board and configured to store operating data; and primary control circuitry disposed on the circuit board and communicatively coupled to the component and to the secondary control circuitry, wherein the primary control circuitry is configured to:

store core control logic separately from the operating data stored in the secondary control circuitry, wherein the core control logic defines a plurality of control outputs transmissible from the primary control circuitry to the component;

retrieve the operating data stored in the secondary control circuitry; and transmit, to the component, a control output of the plurality of control outputs defined by the core control logic and in accordance with the operating data stored in the secondary control circuitry.

18. The HVAC system of claim 17, wherein the secondary control circuitry is configured to store updated operating data, and the primary control circuitry is configured to:

retrieve the updated operating data stored in the secondary control circuitry in response to storage of the updated operating data in the secondary control circuitry; and transmit, to the component, an additional control output of the plurality of control outputs defined by the core control logic and in accordance with the updated operating data stored in the secondary control circuitry.

19. The HVAC system of claim 17, wherein the operating data defines an operating parameter of the component, and the core control logic associates the control output of the plurality of control outputs with the operating parameter defined by the operating data.

20. The HVAC system of claim 17, wherein the secondary control circuitry is configured to store the operating data in non-volatile memory of the secondary control circuitry, and the primary control circuitry is configured to:
- retrieve the operating data stored in the secondary control circuitry;
- store the operating data in volatile memory of the primary control circuitry; and
- transmit, to the component, the control output of the plurality of control outputs defined by the core control logic and in accordance with the operating data stored in the volatile memory.

* * * * *